June 18, 1968  C. W. HARGENS III  3,388,585
FLUID DENSITY MEASURING APPARATUS
Filed April 30, 1965  2 Sheets-Sheet 1
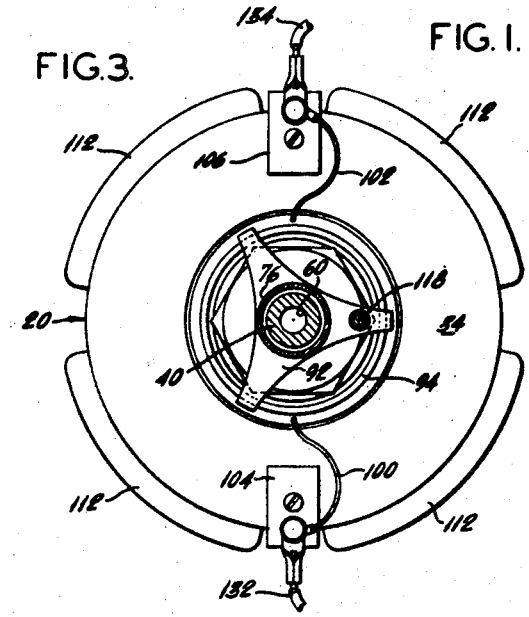
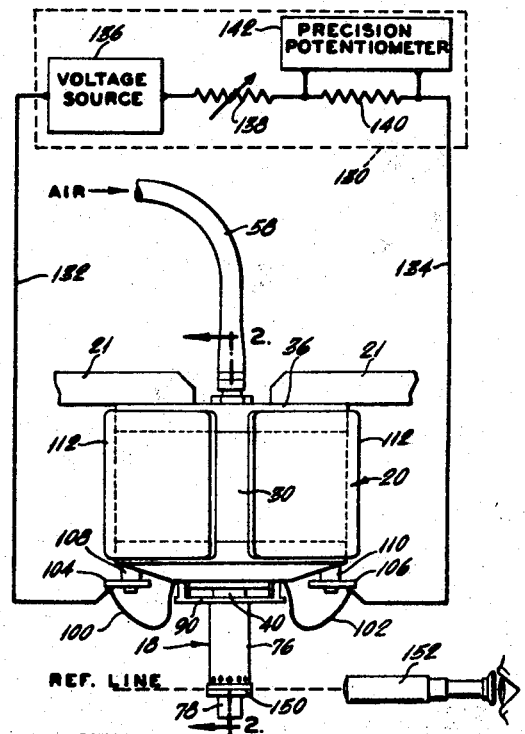
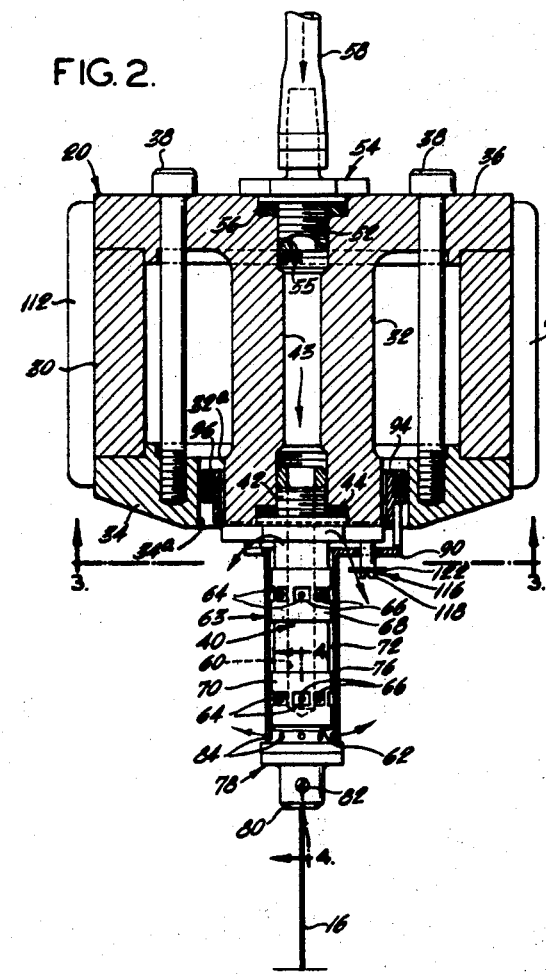
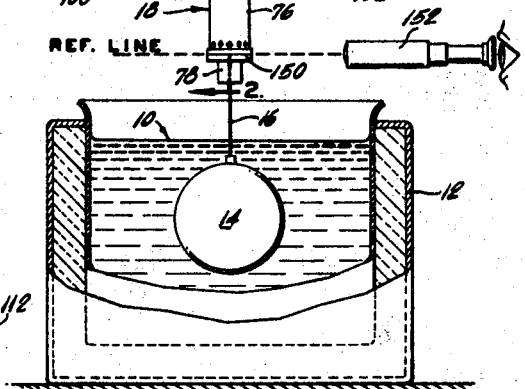
INVENTOR:
CHARLES W. HARGENS, III
BY Howson & Howson
ATTYS.

INVENTOR:
CHARLES W. HARGENS, III
BY Howson & Howson
ATTYS.

United States Patent Office 3,388,585
Patented June 18, 1968

3,388,585
FLUID DENSITY MEASURING APPARATUS
Charles W. Hargens III, Philadelphia, Pa., assignor to The Franklin Institute, Philadelphia, Pa., a corporation of Pennsylvania
Filed Apr. 30, 1965, Ser. No. 452,247
3 Claims. (Cl. 73—32)

ABSTRACT OF THE DISCLOSURE

An apparatus for balancing forces including a core member supported by a frame and having a bore and a plurality of gas passages therethrough, and a force-responsive member supported for movement along the core and having means for receiving an axial force, such as a plummet which may be immersed in a liquid for measuring density thereof. Gas is supplied through the passages for gas-supporting the force-responsive member for substantially frictionless movement relative to the core. A magnet is provided supported by one of the members for producing a magnetic field and a coil is supported by the other of the members within the field of the magnet. A direct current is supplied to the coil in a predetermined manner to produce an increasing force coacting with the magnetic force of the magnet to bias the force-responsive member axially to balance any force, and the value of the current is measured to give indication of the applied force. A reference position of the force-responsive member relative to the core may be provided for calibration.

---

The present invention relates to an apparatus for balancing and/or measuring forces, and particularly to a system suitable for measuring the density of liquids.

There are numerous liquid substances which are of importance in the fields of medicine, biology, research and engineering, and to industry in many varied applications. A fundamental property of all fluids is their specific gravity or density. Specific gravity compares the weight of a liquid to that of an equal volume of water at a standard temperature and is expressed as a dimensionless ratio. On the other hand, density of a liquid is the actual weight per unit volume of the substance and is expressed in dimensions, such as, grams per cubic centimeter, pounds per cubic foot, etc. Either specific gravity or density is immediately calculable from the knowledge of the other of the quantities without independent measurement having to be made as to both quantities, so that information as to one of the quantities can be given with the understanding that the other quantity could have been readily stated. For simplicity of description in regard to the present invention, the measurement of density of liquids will be referred to herein.

In the prior art, systems have been designed to determine the density of a liquid by suspending a force-responsive member above the liquid by means of leaf springs. The force-responsive member usually has a plummet suspended therefrom in the liquid and the lifting force necessary to raise the plummet to some predetermined position is measured by electrical circuitry. Leaf springs or other equivalent means were employed for suspension and alignment of the force-responsive member. In these systems, the smoothness of operation depends critically upon the quality of the leaf spring used for suspension of the force-responsive member. Such systems have left desired a means for supporting the force-responsive member and associated plummet which would provide suspension thereof without introducing factors, such as, the characteristics and quality of the means suspending the force-responsive member.

In accordance with the present invention in its broader aspect of measuring forces generally, the measuring of forces is accomplished by means of a movable gas-supported force-responsive member and a fixed member with a coil on one of the members and a magnet on the other. The coil is responsive to a direct-current component supplied thereto to produce an increasing force coacting with the magnetic force of the magnet to move the movable force-responsive member in a predetermined manner. A force to be measured is applied to the movable force-responsive member and a direct-current component is supplied to the coil in a direction to create a magnetic force to oppose the applied force. The current is controllably adjusted to balance the applied force and to move the movable force-responsive member to a predetermined reference position, and the value of the current required to hold the movable force-responsive member at the reference position is measured. Further according to the invention, gas is supplied under pressure between the movable force-responsive member and the fixed member to provide a gas-bearing support therebetween so that there may be substantially frictionless movement of the movable force-responsive member.

In accordance with one embodiment of the present invention, a suspension system for the force-responsive member and associated plummet is provided which does not retard a limited vertical movement of the force-responsive member and aligns the force-responsive member for substantially frictionless vertical movement relative to the remainder of the apparatus.

The apparatus in one form may be provided by a core member having a bore and having a plurality of gas passages through the core. The force-responsive member is supported for movement along the core member and is adapted for receiving a variable axial force to be balanced and/or measured, the variable axial force being, in the preferred embodiment of the invention, created by a plummet to be suspended in a liquid. A magnet is supported by one of the members, the core member or the force-responsive member, and provides a magnetic flux field. A coil is supported by the other of the members within the flux field of the magnet. The present invention employs means for supplying the coil with a direct-current component to bias the force-responsive member axially upward thereby to balance any downward force exerted by the plummet in the liquid. There is also provided means for indicating the value of the current in the coil. The present invention also employs means for supplying gas under pressure through the gas passages in the core for gas-supporting and force-responsive member along the core for substantially frictionless movement relative to the core.

For a better understanding of these and other features and advantages of the present invention, reference is made to the following description and accompanying drawings, in which:

FIG. 1 is a schematic representation, partially in section, illustrating an overall system in use in accordance with a preferred form of the present invention;

FIG. 2 is a sectional view taken along line 2—2 of FIG. 1;

FIG. 3 is a sectional view taken along the line 3—3 of FIG. 2;

FIG. 4 is a fragmentary sectional view taken along the line 4—4 of FIG. 2;

Figure 5:
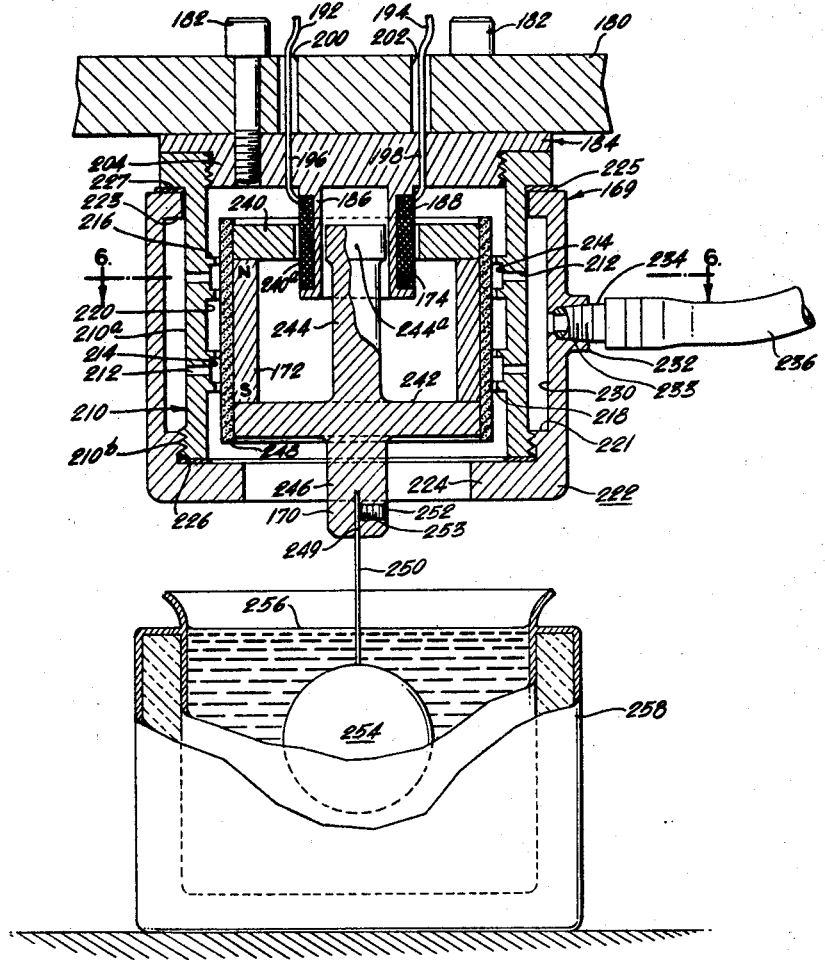
FIG. 5 is a schematic representation, partially in section, illustrating an alternative form of a portion of the apparatus of FIG. 1.

The apparatus for balancing forces of the present invention, although capable of use in balancing forces in a wide variety of different applications, is shown and described balancing the force of a plummet in a liquid medium to determine the density of the liquid.

Referring now to the embodiment of the invention illustrated in FIG. 1, this embodiment is shown in use measuring the density of a liquid 10 contained in an insulated and temperature-controlled vessel 12. One portion of the apparatus comprises a plummet 14, which may be made of glass or steel, designed to sink through the liquid. Plummet 14 is suspended by a thin filament 16 from a force-responsive member generally designated 18 supplied with current from associated circuitry for providing a balancing force. The filament 16 is selected to have a very small circumference so that surface tension forces at the liquid interface are negligible. A second portion of the system shown in FIG. 1 comprises functionally an instrument 20 for suspending the force-responsive member and for providing a coacting force on the force-responsive member for balancing forces exerted on the force-responsive member by the weight of the plummet. More particularly, the instrument provides a magnetic field and the force-responsive member contains a coil located within the magnetic field. In response to the current through the coil, the magnetic field from the instrument exerts a lifting force on the force-responsive member to enable the balancing of any downward forces on the force-responsive member caused by the plummet. By interaction of the magnetic field of the coil and the magnetic field of the instrument, the force-responsive member may be positioned at a predetermined reference point to give indication of the density of a liquid in which the plummet is immersed, as will be explained in detail hereinafter.

More specifically, as can be seen in the sectional view of FIG. 2, the instrument 20, which is held stationary by suitable support structure generally designated 21, comprises an annular permanent magnet 30, an inner pole piece 32 and an outer pole piece 34. While the magnet in some cases may be an electromagnet, it is preferably a permanent magnet of a strongly magnetic material such as "Alnico." The pole piece 32 is formed as a central cylindrical extension of an annular plate 36, which engages one end of the annular magnet 30, and the pole piece 34 is formed as a ring engaging the other end of annular magnet 30. Pole piece 34 is made of sufficient thickness to provide a cylindrical pole face 34a in close proximity to central cylindrical extension pole face 32a.

Annular plate 36 and ring-shaped pole piece 34 are secured to opposite ends of annular magnet 30 in clamping relationship thereto by a plurality of screws 38 which pass through annular plate 36 and are threaded into pole piece 34. It is preferable that the screws be of a non-magnetic material to have them avoid affecting the magnetic circuit.

A tubular core member 40, which is of a non-magnetic material such as stainless steel or aluminum, is provided having a reduced stem portion 42 which is threaded into the end of central pole piece 32 in a central bore 43 through pole piece 32. A sealing O-ring 44 is secured between the core member 40 and central pole piece 32. The central bore 43 through pole piece 32 provides a passage for gas. In the end of bore 43 opposite the end having core member 40 therein there is secured, as by threading, a reduced stem portion 52 of a tubular fitting 54 having an axial bore 55 therethrough. An O-ring 56 provides a seal between tubular fitting 54 and annular pole piece 36. The tubular fitting 54 provides a nipple to which one end of a conduit, such as flexible hose 58, may be connected, the other end of the hose being connected to a suitable gas supply at a desired pressure. Gas, such as dry air or preferably dry nitrogen which is non-corrosive, is thereby supplied through the bores 55 and 43.

The tubular core member 40 is provided with a central bore 60 which extends through the core from the stem portion 42 to adjacent opposite end 62 of the core member, as shown in FIG. 4. The bore 60 of the core communicates with bore 43 of central pole piece 32.

The force-responsive member 18 comprises a very light tubular portion generally designated 63 which may be made of accurately machined and finished aluminum, slidably mounted on the exterior of tubular core member 40 for substantially frictionless bearing support relative to the core member. In accordance with the preferred form of the invention, bearing support is provided by a film of gas escaping from an annular series of small radial outlet openings 64 in flats 66 provided in each of two enlarged portions 68 and 70 of the core member 40. The radial outlet openings 64 are preferably of a size such that the escape of gas is only sufficient to provide gas-support bearing action. An annular exterior groove 72 is formed between the enlarged portions 68 and 70 of the core member 40. The enlarged portions 68 and 70 fit closely adjacent a sleeve 76 of tubular portion 63, enough space being left for a gas-support bearing therebetween. The outlet openings 64 in the enlarged portions 68 and 70 of the core 40 are located adjacent opposite ends of the sleeve 76 for accurate axial alignment of the tubular portion and for gas-supporting the tubular portion for substantially frictionless axial movement relative to the core 40.

As can be seen in FIGS. 2 and 4, a tubular end cap 78, preferably of machine stainless steel, is provided over the lower end of sleeve 76 and is secured thereto by a press fit. End cap 78 has a central downward extension 80 having an axial hole into which filament 16 is inserted and having a radial hole 81 communicating with the axial hole into which screw 82 is threaded for securing the filament 16 in extension 80.

A plurality of openings 84 are provided in sleeve 76 adjacent end cap 78 to permit escapage of gas from the sleeve. This gas may escape at each end of sleeve 76, at one end through openings 84 and at the other end through the open end of the sleeve near pole piece 32.

The sleeve 76 at the end near pole piece 32 is provided with an enlarged skirt portion 90 carried by a radial spider portion 92, having three-spaced spider arms. Located on the inner end of skirt 90 there is secured a non-metallic annular coil bobbin 94 around central extension 32 on which is wound in loops concentric with the bobbin a coil 96 of extremely small, light, insulated wire, for example 80 turns of No. 46 wire.

Electrical connection to the coil is made by means of thin hair-like conductive leads 100 and 102 attached to terminal plates 104 and 106, respectively, as shown in FIGS. 1 and 3. The terminal plates 104 and 106 may be mounted to pole piece 34 by means of screws within sleeve spacers 108 and 110, respectively. The screws and sleeves spacers are preferably insulated from terminal plates 104 and 106 by any suitable means.

The axial length of bobbin 94 is relatively small in comparison with the axial length of central extension pole face 32a and the cylindrical pole face 34a of pole piece 34. By this arrangement, the coil 96 in bobbin 94 remains within the magnetic field between the pole face piece 32a and central pole face 34a over a small distance of travel of the coil between the ends of the effective length of the pole pieces, so that the coil is exposed to a substantially constant magnetic field during its travel.

With the coil arranged as described supported in the air gap of the magnetic circuit provided by magnet 20 and pole pieces 32, 34 and 36, the coil can be supplied with a direct current component of a suitable value to bias the coil upwardly, and hence the force-responsive member 18 which comprises the skirt 90, the spide 92, sleeve 76 and end cap 78, thereby to balance any downward force of the plummet 14 within the liquid. By suitable circuitry connected to the conductive leads 100 and 102 at terminal plates 104 and 106, respectively, the direct current component can be supplied to the coil and measured to provide an indication of the downward force exerted by the combined weights of the force-responsive member and the plummet, the upward balancing force produced by the current being inversely proportional to the density of the liquid in which the plummet is immersed. Of course, the proper direction of current through the coil should be used so that that magnetic force created by the current is directed to move the force-responsive member upwardly rather than downwardly.

The balancing coil's lifting force on the plummet is determined by the magnitude of the current flowing in the coil and the magnetic field strength created by the annular magnet. The magnetic field strength of the permanent magnet can be depended upon to remain constant within the limits of accuracy of measurement desired. Thus, the only variable necessary to be considered and measured is the value of current flowing in the balancing coil 96. However, in cases where greater stability of the magnetic field created by the magnet is required, arcuate plates 112 of metal conforming to the annular contour of the magnet 30 and pole pieces 34 and 36, as shown in FIGS. 2 and 3, may be employed to provide permeability compensation for thermal perturbations of the magnet. The plurality of plates 112 partially shunt the magnet and provide a temperature coefficient for the magnet assembly such that the tendencies of the magnet to lose its retentivity with temperature is decreased.

As indicated in FIG. 1, the apparatus of the present invention is oriented vertically along the axes of its associated parts, and in this orientation if a current is not flowing in coil 96 to provide a lifting force on the force-responsive member and plummet, the force-responsive member will fall away from the instrument 20. The downward movement of the force-responsive member is limited by stop 116, which comprises a screw 118 extending through a hole in the spider 92 and threaded into a radially extending portion of the core member 40, the screw being located in a sleeve spacer 120 with a washer 122 resting adjacent the head of the screw. The washer 122 provides the stop against which the spider 92 abuts for limiting the downward movement of the force-responsive member.

There is illustrated schematically in FIG. 1 one arrangement of a balance circuit for supplying a direct current component to coil 96 and for measuring the value of the current flowing in the coil. The balancing circuit generally designated 130 is connected to terminal plates 104 and 106 by means of electrical connectors 132 and 134. The balance circuit comprises the series combination of a direct current voltage source 136, a controllably variable current-limiting resistor 138, and a resistor 140 which has a precision potentiometer 142 connected in parallel therewith. The direct current voltage source 136 may be provided by a battery. In this instance, the voltage source 136 and variable resistor 138 need not be precision components since the accuracy of the circuit may be made dependent upon the stability of resistor 140 and precision potentiometer 142 which is employed to measure the voltage drop across resistor 140. In this arrangement, the voltage drop measured across the resistor by the potentiometer divided by the known value of the resistor gives the value of the current flowing in the circuit. From the knowledge of the value of the current flowing in the circuit, the numerical value of the density of the liquid in which the plummet is immersed may be determined. This determination can be made in the following manner. The current necessary to be flowing in the coil to suspend the force-responsive member and plummet in different density liquids at a predetermined reference point with respect to the position of the force-responsive member can be determined for a few known liquids. Only a few calibration measurements of this type need be made, since the relationship between density of a liquid and the value of current to balance the force-responsive member at a specific reference point is essentially linear, and thus any unknown density may be easily interpolated once the value of curent necessary to balance the force-responsive member at the reference point is known for a few different densities of liquids. The buoyant force of the liquid varies directly with the liquid density and the magnetic lifting force necessary to balance the force-responsive member at a reference point varies directly with the balance coil current flowing in the coil. Therefore, the density of a liquid and the value of balance coil current necessary to balance the force-responsive member are directly correlated by an inverse functional relationship.

Various modifications of the balancing circuit 130 may be made, depending on the accuracy of measurements desired. In circumstances where less exacting measurements are desired, the precision potentiometer can be eliminated from the circuit, with the result that the burden of accuracy of the measurement is placed on constancy of the direct voltage from source 136 and the value of the series variable resistor. In this instance the variable resistor may be of a vernier type with its dial calibrated directly in liquid density units. If, for example, the apparatus is to be used to measure a quantity related to density but non-linear with respect to balance coil current, such as in measuring the proof of alcoholic beverages, the calibration of proof can be placed on the dial of the variable resistance after determining such calibration by making measurements of values of balance coil current required for various known proofs of liquids.

One manner of providing the reference point or null positioning of the force-responsive member is by employing a reference line 150 marked on end cap 78 as shown in FIG. 1, the reference line 150 being viewed through an optical system generally designated 152. The optical system is maintained at a predetermined position relative to the apparatus and may preferably be provided with cross-hairs for accurately positioning the reference line along the cross-hair to precise positioning of the force-responsive member at the reference point. In this arrangement, the force-responsive member with its associated plummet immersed in the liquid would be brought to the reference point by means of the balancing force exerted by current flowing in the coil. As previously stated, by calibrating the balancing circuit through the use of several liquids of known density, with the force-responsive member balanced at the reference point and the value of current necessary to create this condition being determined, the unknown value of density of other liquids may be determined by interpolation through the relationship of density to current previously set forth.

The reference point or null positioning may be provided by systems other than the optical system previously described. For example, a differential transformer and associated electronic circuitry may be employed, such as described in Patent No. 3,054,296 of myself and George A. Smith, filed Jan. 16, 1959, entitled "Apparatus for Specific Gravity Measurements." The balancing process can also be performed automatically through the use of a servo-mechanism arrangement, such as described in Patent No. 3,154,950 of myself and George A. Smith, filed Nov. 14, 1955, entitled "Apparatus for Specific Gravity Measurements." However, for very sensitive measurements with the apparatus, the optical means previously described is the least likely to produce any undesired force reactions on the delicate balancing system.

Figure 6:
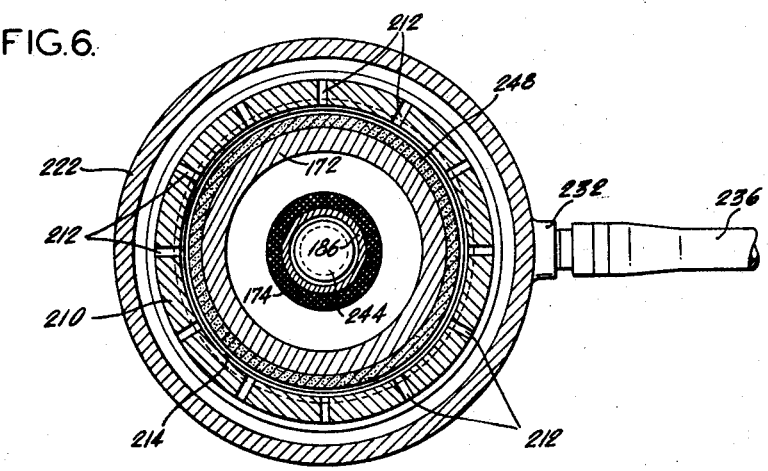
FIG. 6 is a sectional view taken along the line 6—6 of FIG. 5.

FIGS. 5 and 6 illustrate an alternative form of the apparatus of the present invention in which the electrical connection is made to the stationary instrument generally designated 169 rather than to the movable force-responsive member generally designated 170. In this instance, permanent magnet 172 is a part of the force-responsive member 170 and provides the balancing force, and electrical connections to a coil 174 which comprises a part of the instrument 169 provide a coacting force with the magnet of the force-responsive member for balancing any downward force of the force-responsive member and plummet.

More specifically, as can be seen in FIGS. 5 and 6, the instrument 169 is supported from above by a support structure 180 having screws 182 passing therethrough and threaded into circular base plate 184 of non-magnetic material. Base plate 184 has a central cylindrical extension 186 providing a non-magnetic coil bobbin on which a coil 188 of fine insulated wire is wound. The coil is of the same general form as the coil of FIG. 2 but of smaller diameter and greater length. Extension 186 of base plate 184 is provided with an axial bore 190. Electrical connection to the coil is made by means of insulated conductive leads 192 and 194 which extend through holes 196 and 198, respectively, in the base plate and aligned holes 200 and 202, respectively, in the support structure. The leads 192 and 194 from the coil may be connected to a balance circuit identical with or similar to the balance circuit previously described and shown in FIG. 1.

Around the periphery of base plate 184 there is provided an externally threaded recess portion 204 for receiving an annular core member 210 having an internally threaded portion adjacent one end arranged in threaded engagement with the threaded portion of the base plate 184.

Core member 210 has an externally reduced diameter portion 210a provided with an annular series of small radial inlets 212 extending through the core member and opening into annular recesses 214 in each of two internally enlarged portions 216 and 218 of the core member 210. An annular internal groove 220 is formed between the enlarged portions 216 and 218 of the core member 210.

Adjacent the lower end of the core member there is formed an externally threaded portion 210b which is in threaded engagement with an internally threaded and internally enlarged portion 221 of a generally annular sleeve 222. At opposite ends of sleeve 222 there are provided inwardly projecting annular rims 223 and 224, respectively, with rim 223 abutting an annular shoulder 227 formed by the reduced diameter portion 210a of the core member, a sealing gasket 225 being provided therebetween, and with rim 224 abutting the reduced diameter portion end of core member 210, a sealing gasket 226 being secured between the reduced diameter portion end of the core member and rim 224. Rim 224 extends inwardly of the bore of the annular core member 210 to reduce the size of the opening to the bore.

The rim 223 and internally enlarged portion 221 of sleeve 222 space the central portion of the sleeve away from the reduced diameter portion of the core member so as to form an annular chamber 230 therebetween for passage of gas around the core member and into inlet openings 212 therein. In a sidewall of sleeve 222 an annular outwardly flared boss 232 is provided having an internally threaded opening 233 therethrough to chamber 230. A tubular fitting is arranged in threaded engagement with the internally threaded opening 233 in sleeve 222. A conduit such as a flexible hose 236 is connected to the tubular fitting 234 and thence to a suitable gas supply, such as dry air or dry nitrogen, at a desired pressure. The gas is introduced through hose 236 to chamber 230 where it is forced by pressure through inlets 212 for providing a gas-support bearing for the force-responsive member.

The force-responsive member 170 is located adjacent the internally enlarged portions 216 and 218 within the bore of the annular core member 210, enough space being left between the core and the force-responsive member for a gas-support bearing, as previously referred to. In the present instance, the force-responsive member 170 comprises an annular permanent magnet 172, preferably of a strong magnetic material such as "Alnico," an annular pole piece 240 at one end thereof and a circular pole piece 242 at the other end of the magnet. Pole piece 242 is formed as a circular plate having central extensions 244 and 246 on opposite sides thereof.

The magnet 172 and pole pieces 240 and 242 are held together by means of the magnetic flux produced by magnet 172, and for convenience in aligning the magnet with the pole pieces, the pole pieces may be provided with recesses adjacent their periphery into which the magnet may be fitted. The specific arrangement of the pole pieces is such that annular pole piece 240 forms a ring-like pole face 240a adjacent the exterior of coil 188 with the axial length of the coil being much greater than the axial length of the ring-like pole face 240a. The arrangement of the central extension 244 of pole piece 242 is such that extension 244 extends within bore 190 of bobbin 186. By this arrangement, a magnetic circuit is provided for the magnetic flux of the magnet through pole piece 240, across the gap between pole face 240a to central extension pole face 244a through extension 244 and pole piece 242 and back to the magnet. The coil 188 is located in the gap between the pole face 240a and extension pole face 244a so that magnetic flux from the magnet passes through the coil.

Around the periphery of annular magnet 172 and pole pieces 240 and 242, a non-magnetic bearing sleeve 248 is secured as by being press fitted thereover. The bearing sleeve provides a suitable surface for the gas bearing. The bearing sleeve fits closely adjacent the internally enlarged portions 216 and 218 of core 210, enough space being left for a gas-support bearing therebetween. The inlets 212 in enlarged portions 216 and 218 of the core are located adjacent opposite ends of the sleeve for accurate axial alignment of the force-responsive member and for supporting the force-responsive member for substantially frictionless axial movement relative to the core.

As can be seen in FIG. 5, central extension 246 of pole piece 242 extends through the opening in inwardly projecting rim 224 of sleeve 222 and has an axial hole 249 in its end into which filament 250 is inserted. The filament is held in place by means of a screw 252 threaded through a radial hole 253 communicating with the axial hole, thereby securing the filament therein. At the other end of the filament, plummet 254 is suspended in a liquid medium 256 within an insulated and temperature controlled vessel 258, in the manner described in regard to FIG. 1. In this instant embodiment of the invention, the weight of the force-responsive member with its permanent magnet is such that it may be desirable in this embodiment to have the plummet comprise a float and the filament comprise a rigid steel wire so that the plummet and wire serve to give some support to the force-responsive member.

In operation of the apparatus for measuring the density of liquid of FIG. 5, when the coil is not energized by a current flowing therein, the bearing sleeve 248 of force-responsive member 172 will rest upon rim 224 of sleeve 222. In use of the apparatus, gas is supplied at a desired pressure through hose 236 into chamber 230 where it passes through gas inlets 212 to provide a gas-support bearing for the force-responsive member 170 relative to core 210. By this arrangement of the gas-bearing suspension of the force-responsive member, the force-responsive member may be moved axially with substantially frictionless movement relative to core 210. When a current is supplied to coil 188 the force-responsive member will be raised axially to any desired position of the pole piece 240 along the stationary coil, depending on the magnitude of the current flowing in the coil. As in the previous embodiment of the invention, a reference position for the force-responsive member should be provided, as by a reference line on extension 246 of the force-responsive member, and the density of liquids in which the plummet is immersed may be determined by the magnitude of current required to balance the force-responsive member at the reference position. The function of the coil and magnet is the same as described in regard to FIG. 1, but in the embodiment of FIG. 5 the location of the coil and magnet have been reversed, with the coil being located on the instrument and the magnet being a part of the force-responsive member.

It should be understood that the apparatus of the present invention can operate to balance downward forces on the force-responsive member exerted by means other than a plummet immersed in liquid. For example, the force-responsive member can have suspended therefrom a weighing platform, the apparatus being used as a precision instrument for weighing small quantities of material. In this application, the measurements of current required to provide a balancing force can be converted to desired units of mass.

It will be observed that in accordance with the present invention an improved gas suspension system is provided for the force-responsive member which exerts no restoring force thereon when the force-responsive member is displaced from its reference position. The gas-bearing suspension system of the present invention adds substantially no axial force on the force-responsive member if constructed in accordance with the description herein, and, if a small axial component force is created, it will be constant rather than increasing with displacement of the force-responsive member and hence can be disregarded. It will be appreciated by those skilled in the art that the capabilities of the apparatus described fulfill the need for an economical and compact assembly that is useful in a wide variety of application to provide precise measurements of force applied thereto.

While the invention has been described with particular reference to specific embodiments thereof in the interest of complete definiteness, it should be understood that it may be embodied in a large variety of forms diverse from those specifically shown and described, without departing from the scope and spirit of the invention as defined by the appended claims.

I claim:
1. An apparatus for measuring density of fluid comprising:
   a supporting frame;
   a core supported by said frame having an axial bore and having a plurality of gas inlets;
   a coil supported by said frame within said bore;
   a force-responsive member supported for movement along said core;
   a plummet suspended from said force-responsive member and immersed in said fluid;
   a magnet supported by said force-responsive member for providing a magnetic flux field;
   said force-responsive member providing a pole piece positioned for having said coil within said flux field;
   means for supplying said coil with a direct current component in a predetermined manner to bias said force-responsive member axially to balance any downward force of said plummet in said fluid;
   means for providing an indication of the value of said current in said coil;
   means for indicating a reference position for said force-responsive member so that any force received by said force-responsive member from said plummet may be balanced by said current and said force-responsive member thereby positioned at said reference position; and
   means for supplying gas under pressure through said gas inlets for gas-supporting said force-responsive member along said core for substantially frictionless movement relative thereto.

2. An apparatus for measuring density of fluid comprising:
   a supporting frame;
   a core supported by said frame having an axial bore and having a plurality of gas inlets;
   a coil supported by said frame within said bore;
   a force-responsive member supported for movement along said core;
   a float connected to said force-responsive member and immersed in said fluid;
   a magnet supported by said force-responsive member for providing a magnetic flux field;
   said force-responsive member providing a pole piece positioned for having said coil within said flux field;
   means for supplying said coil with a direct current component in a predetermined manner to bias said force-responsive member axially to balance any downward force of said float in said fluid;
   means for providing an indication of the value of said current in said coil;
   means for indicating a reference position for said force-responsive member so that any force received by said force-responsive member from said float may be balanced by said current and said force-responsive member thereby positioned at said reference position; and
   means for supplying gas under pressure through said gas inlets for gas-supporting said force-responsive member along said core for substantially frictionless movement relative thereto.

3. An apparatus for measuring the density of fluid comprising:
   a supporting frame;
   a coil supported by said frame having an axial bore and having a plurality of gas passages therethrough;
   a coil supported by said frame along said core;
   a force-responsive member supported for axial movement along said core;
   a plummet suspended from said force-responsive member and immersed in said fluid;
   a magnet supported by said force-responsive member for providing a magnetic flux field;
   said force-responsive member providing a pole piece positioned for having said coil within said flux field;
   means for supplying said coil with a direct current component in a predetermined manner to bias said force-responsive member axially to balance any downward force of said plummet in said fluid;
   means for providing an indication of the value of said current in said coil;
   means for indicating a reference position for said force-responsive member so that any force received by said force-responsive member from said plummet may be balanced by said current and said force-responsive member thereby positioned at said reference position; and
   means for supplying gas under pressure through said gas passages for gas-supporting said force-responsive member along said core for substantially frictionless movement relative thereto.

References Cited

UNITED STATES PATENTS

| | | | |
|---|---|---|---|
| 2,273,850 | 2/1942 | Ewald | 73—452 |
| 2,958,137 | 11/1960 | Mueller | 73—516 |
| 3,034,348 | 5/1962 | Holderer | 73—141 |
| 3,040,585 | 6/1962 | Chatel et al. | 73—453 |
| 1,717,684 | 6/1929 | Helgeby | 73—497 |
| 1,826,024 | 10/1931 | Roller | 177—212 |
| 2,591,921 | 4/1952 | Cosgriff et al. | 73—516 |
| 3,133,606 | 5/1964 | Thomson | 177—212 |
| 3,186,505 | 6/1965 | Vinzelberg et al. | 177—210 |

JAMES J. GILL, *Primary Examiner.*

RICHARD C. QUEISSER, *Examiner.*

DOUGLAS SCHNEIDER, JOHN P. BEAUCHAMP, *Assistant Examiners.*